May 12, 1925.
A. HOLMQUIST, SR
1,537,170
CAN FILLING MACHINE
Filed March 13, 1919  5 Sheets-Sheet 1
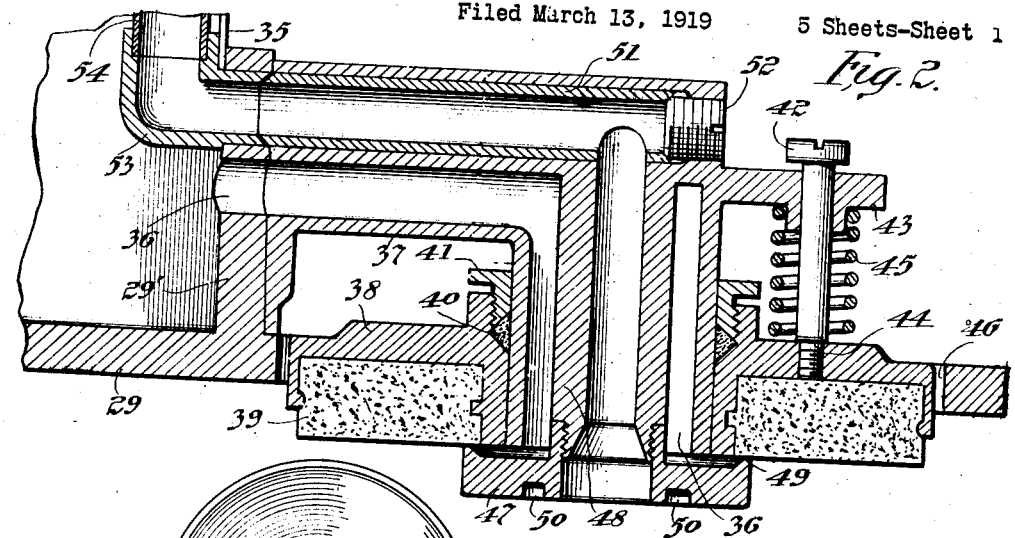
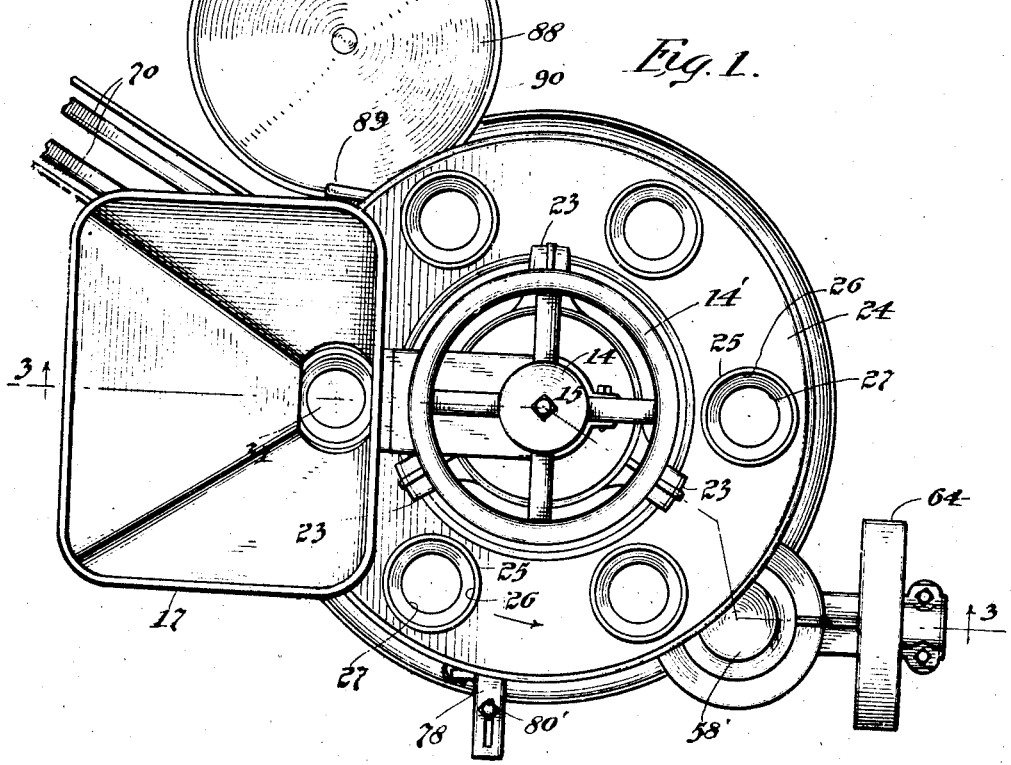

May 12, 1925.  1,537,170
A. HOLMQUIST, SR
CAN FILLING MACHINE
Filed March 13, 1919  5 Sheets-Sheet 2
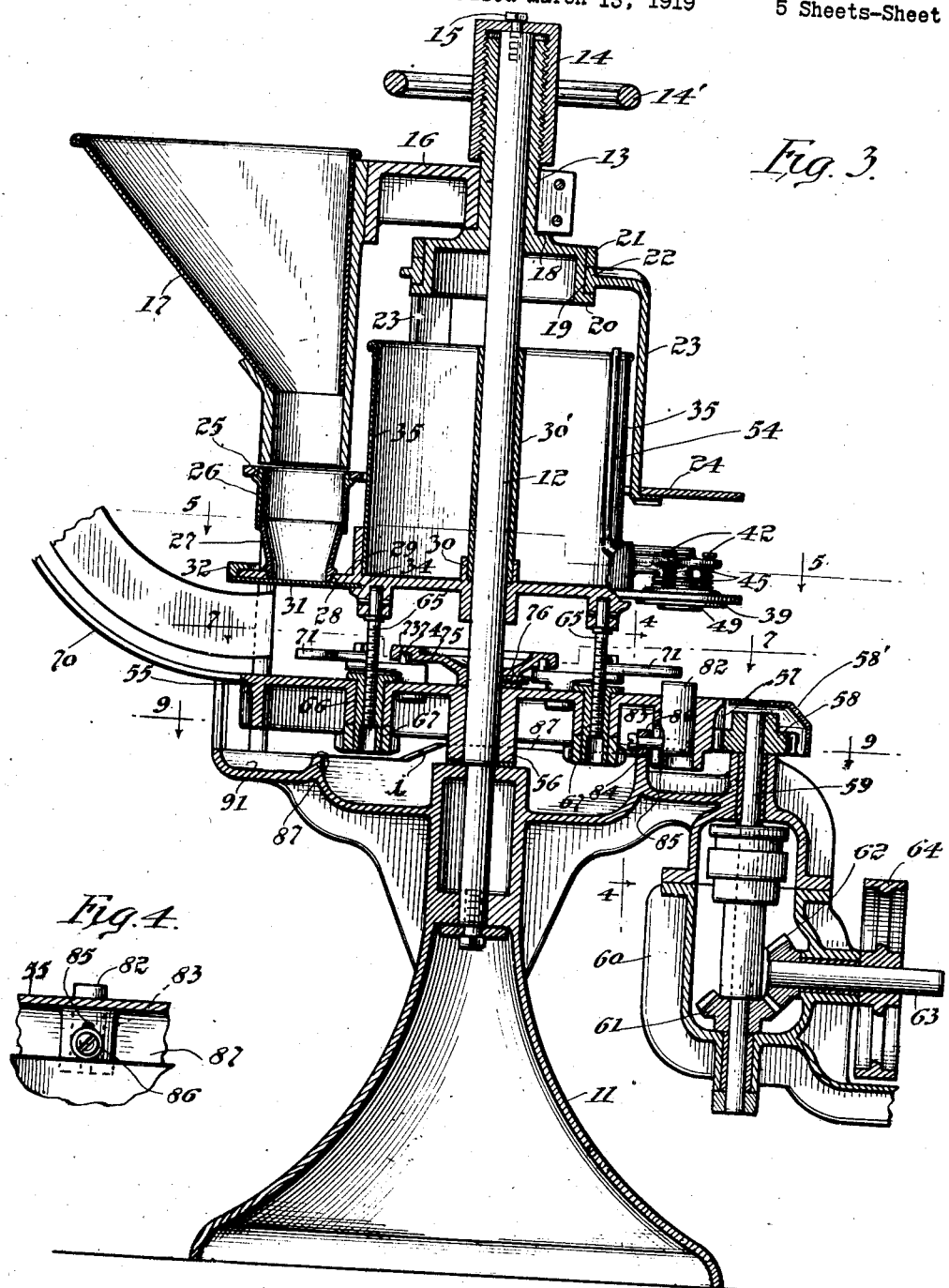

May 12, 1925.

A. HOLMQUIST, SR
CAN FILLING MACHINE
Filed March 13, 1919

Inventor:
August Holmquist Sr.
By Jones, Addington, Ames & Seibold
Attys.

May 12, 1925.

A. HOLMQUIST, SR 1,537,170

CAN FILLING MACHINE

Filed March 13, 1919

Inventor.
August Holmquist Sr.
By Jones, Addington, Ames & Seibold
Attys.

May 12, 1925.

A. HOLMQUIST, SR 1,537,170

CAN FILLING MACHINE

Filed March 13, 1919

Inventor;
August Holmquist Jr.
By Jones, Addington, Ames & Seibold
Attys.

Patented May 12, 1925.

1,537,170

UNITED STATES PATENT OFFICE.

AUGUST HOLMQUIST, SR., OF HOOPESTON, ILLINOIS, ASSIGNOR TO SPRAGUE CANNING MACHINERY COMPANY, OF CHICAGO, ILLINOIS, A CORPORATION OF ILLINOIS.

CAN-FILLING MACHINE.

Application filed March 13, 1919. Serial No. 282,475.

*To all whom it may concern:*

Be it known that I, AUGUST HOLMQUIST, Sr., a citizen of the United States, residing at Hoopeston, in the county of Vermilion and State of Illinois, have invented new and useful Improvements in Can-Filling Machines, of which the following is a full, clear, concise, and exact description, reference being had to the accompanying drawing, forming a part of this specification.

My invention relates to improvements in can filling machines, especially of that type designed for use in connection with peas, beans, berries, or other similar material with which, in the filling of the can, is mixed a quantity of liquid material, such as brine.

The object of my invention is the production of a machine of this character which will be so constructed as to permit of the same being readily maintained in a clean and sanitary condition; one which will be compact and confined to small area or space, and one which will be of durable and economical construction. A further object is the production of an improved can filling machine in which, during the operation of the machine, the liquid or brine will not be discharged from the reservoir therefor, except when a can is positioned to receive the same. Other objects will appear hereinafter.

The invention consists in the combinations and arrangements of parts hereinafter described and claimed.

The invention will be best understood by reference to the accompanying drawings forming a part of this specification, and in which—

Fig. 1 is a top plan view of a can filling machine embodying the invention;

Fig. 2 is an enlarged detail section taken on substantially line 2—2 of Fig. 5;

Fig. 3 is an axial section through the machine, the section being taken along substantially line 3—3 of Fig. 1;

Fig. 4 is a detail section taken on substantially line 4—4 of Fig. 3;

Figures 5, 6:
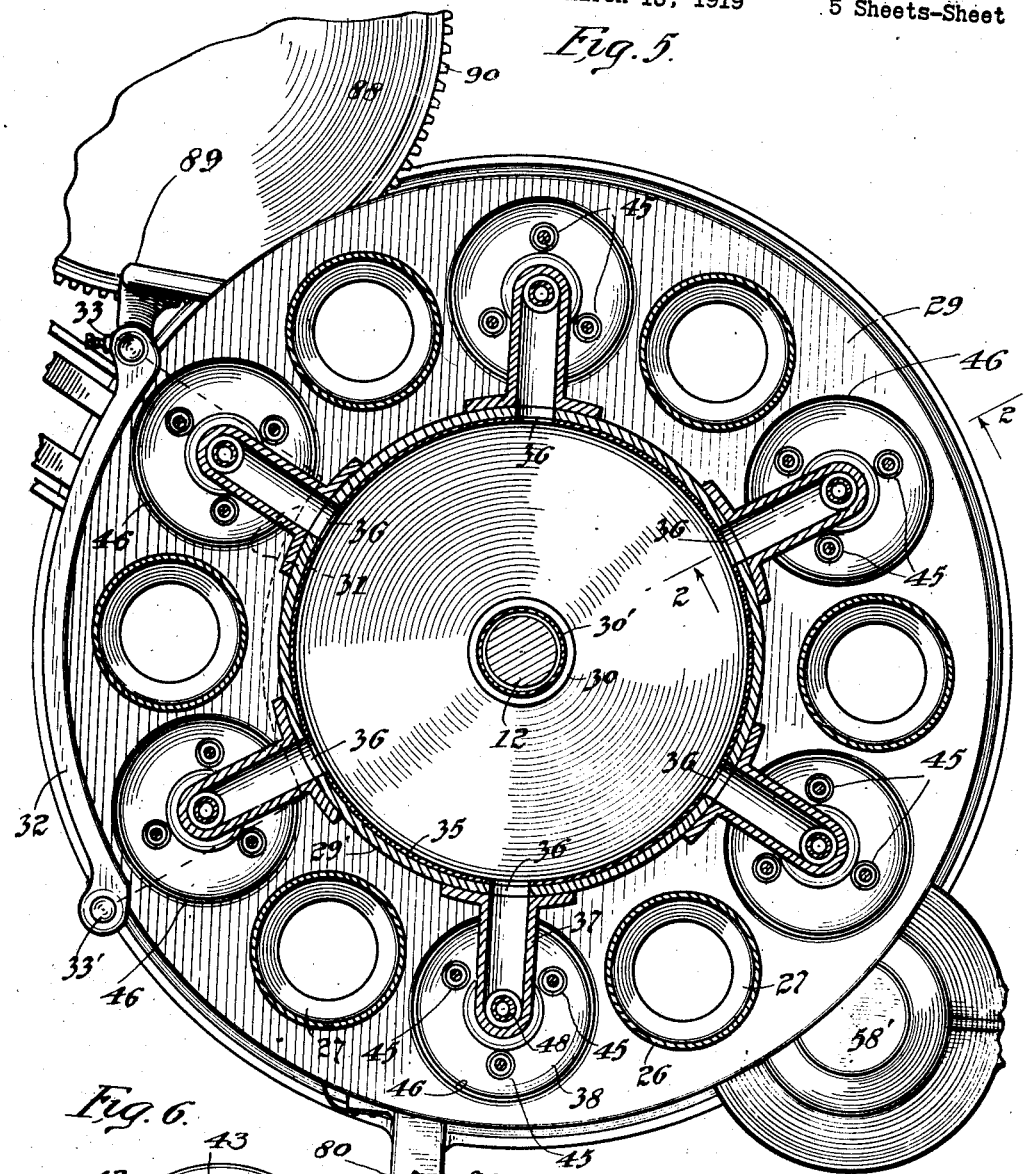
Fig. 5 is an enlarged horizontal section taken on substantially line 5—5 of Fig. 3.
Fig. 6 is a fragmentary top plan view of one of the brine discharging devices.

The preferred form of construction, as illustrated in the drawings, comprises a base 11, in which is rigidly anchored the lower end of a centrally positioned column 12. Slidably adjustable upon the upper end of column 12 is a sleeve 13 having external threads at its upper end portion engaged by an internally threaded cap 14, which rests upon the upper end of column 12, being secured thereto by a screw or bolt 15. Upon the cap 14 is formed a hand wheel 14', through the medium of which said cap may be rotated in order to effect vertical sliding or adjustment of sleeve 13 upon column 12.

Clampingly embracing the lower portion of the sleeve 13 is an outwardly projecting arm or bracket 16 supporting at its outer end a pea hopper 17. The lower end of the sleeve 13 is enlarged or flanged to constitute a support for the under side of arm 16, and in the periphery of the enlarged portion of said sleeve is provided a circumferential groove 19, which is formed by spaced flanges 20 and 21, the latter being removable to permit of assembling of the parts. In the groove 19 is loosely mounted a ring 22 from which depend spaced arms 23; said ring and arms constituting a spider for the support of an annular horizontal plate 24.

In the plate 24 is provided a plurality of equally spaced openings 25, adapted, upon rotation of said plate to be brought into successive registration with the outlet of hopper 17, as is clearly seen in Fig. 3. The plate 24 serves as a carrier for the upper tubular sections 26 of the pea measuring cups, the upper ends of said sections 26 being secured rigidly in the openings 25. Telescoping with the lower ends of sections 26 are the lower sections 27 of the pea measuring or discharge cups which are secured rigidly in correspondingly spaced openings 28 in a disc 29 spaced below and arranged parallel with the plate 24. The disc 29 is formed at its center with a hub 30 which loosely embraces the column 12, permitting of free rotary movement of said plate about said column.

Arranged for registration with the lower ends of sections 27 of the pea measuring devices is a plate 31, which is positioned directly below the outlet of hopper 17, so as to prevent discharge of peas from the measuring devices during registration of said devices with said hopper. The plate 31 is secured to a support 32, which in turn is held rigid by posts 33 which arise from the base 11, as is clearly seen in Figs. 5, 7, and 9. In order to support the inner end of the plate 31, the disc 29 is formed with an annular groove 34 with which the inner end of said plate slidably engages, as is clearly seen in Fig. 3.

Carried by the disc 29 is a brine reservoir, said disc constituting the bottom of said reservoir, an axially positioned cylindrical wall 35, which projects upwardly therefrom, constituting the lateral wall of said reservoir. The lower end of wall 35 is rigidly secured to a flange 29' rising from and formed integrally with said disc. Leakage from the brine reservoir around the hub 30 of disc 29 is prevented by a sleeve 30' securely fastened at its lower end in said hub, and rising to the height of said reservoir, said sleeve loosely embracing column 12.

Leading from the said brine reservoir adjacent the lower end thereof and arranged alternately with reference to the pea discharge devices are spaced outlet passages 36 of brine discharge devices which radiate from said reservoir. The outer ends of said passages are formed in the nozzles or bodies 37 of said brine discharge devices, which nozzles are carried by the disc 29, the same being rigidly secured to the flange 29' formed on said disc. Said nozzles are of angular form, the outer end portions thereof being vertically disposed and cylindrically formed. Upon the vertically disposed portion of each of said nozzles is slidably mounted the annular carrier 38 for a resilient pad 39. To prevent leakage between the contacting surfaces of each carrier 38 and the corresponding nozzle, a suitable packing 40 is provided, held in place by a screw flange 41.

Each pad 39 is provided with three screws 42 which are threaded at their lower ends into the holder 38, and which project upwardly therefrom, slidably engaging with radially extending lugs 43 formed upon the corresponding nozzle 37, as is clearly seen in Fig. 6. The lower ends of said screws are formed with shoulders 44 which are adapted to engage against the upper side of the holder 38 to thus serve to securely lock the screws to said holder. Interposed between each holder 38 and the corresponding lugs 43 are helical compression springs 45 which surround the screws 42, being thus held thereby against displacement. The springs 45 serve to yieldingly hold the corresponding pad 39 at its lower terminal of movement.

The pads 39 project through openings 46 formed in the disc 29 for engagement with the cans A to be filled, the cans, during operation of the machine, being carried immediately below said disc, as will be hereinafter more fully described. Discharge from each passage 36 is normally prevented by a valve 47 arranged at the lower end thereof, which valve is threaded upon a tubular stem 48 formed in the corresponding nozzle 37 axially of the lower vertical portion of the passage 36 thereof. The upper side of each valve is of dished formation resulting in the provision of an annular upwardly extending peripheral flange 49 which is adapted to engage against the under side of pad 39, and in the underside of each valve two diametric recesses 50 are provided for engagement by a suitable wrench whereby the valve may be readily applied or removed. The arrangement is such, as will be seen, that the springs 45 exert a downward pressure upon each pad 39 which normally holds the same in close contact with the flange 49 of the corresponding valve 47, thus serving normally to prevent escape from the corresponding passage 36. Thus, also, it will be seen that discharge from the brine discharge devices and hence from the brine reservoir may be effected only upon upward movement of the pads 39 to lift the same from engagement with the corresponding valves 47.

The member 47 acts as a combined valve, spreader and displacement member. The liquid flowing down through the annular passage 36 is caused to spread out in a sort of film by the member 47, which prevents splashing. The member 47 acts as a displacement member whereby the can can be filled to just the desired height. It is usually not desired that the can should be filled brimful, and the desired amount of fill can be secured by properly designing the size of the member 47. As this member is readily detachable it can easily be taken off and another one substituted. The heads of the screws 42 serve to keep the holder 38 from slipping down off of the nozzles 37, when the member 47 is removed.

It will be noted that the pads 39 have an annular surface of considerable extent lying beyond the member 47; whereby they can be used with cans of different sizes, and whereby it is not necessary to accurately center the cans with respect to the discharge devices. It will also be noted that the lower surface of the pad 39 is flat, whereby no part of it extends down into the can.

The upper ends of the passages in stems 48 communicate with inwardly extending tubes 51 which are closed at their outer ends by screw plugs 52. The inner ends of tubes 51 communicate with elbows 53 against which the same are pressed by plugs 52. Arising from the inner ends of elbows 53 are tubes 54, which are arranged in the brine reservoir adjacent the lateral wall thereof. The communicating passages through the stem 48, tube 51, elbow 53 and tube 54 of each brine discharge device constitute a vent through which the air in a can may escape as the can is filled with brine.

Arranged below the disc 29 is a can carrying table 55 having a central hub 56 which loosely engages the column 12, so as to permit of rotation of the table about said column. The lower end of hub 56 rests upon the upper end of base 11, which thus serves to support the same. Formed in the periphery of table 55 is a gear 57 with which meshes a pinion 58 carried at the upper end of a shaft 59 mounted in suitable bearings provided in the base 11 and a supplemental bearing member 60 secured to said base. The lower end of shaft 59 is provided with a bevel gear 61 with which meshes a bevel gear 62 carried by a shaft 63, also mounted in the bearing 60; said shaft 63 having a pulley 64 through the medium of which power may be applied to said shaft for driving the same. A housing 58' is arranged over the upper end of shaft 59 and pinion 58 for protection.

The can carrying table 55 is connected with the disc 29 by means of two diametric screws 65, the upper ends of which are securely fastened in bosses provided therefor on the under side of said disc, the lower ends of said screws being threaded into internally threaded sleeves 66 which are rotatively mounted in suitable bosses provided in said table. Applied to the lower ends of sleeves 66 are worm wheels 67 with which mesh worm gears 68 carried by a shaft 69 mounted in suitable bearings depending from the under side of table 55. One end 69' of the shaft 69 is squared, as is clearly seen in Fig. 9, to permit of engagement with a suitable wrench whereby said shaft may be rotated. The arrangement is such, as will be seen, that the disc 29 may be adjusted toward and from the table 55 through rotative adjustment of shaft 69, it being clear that upon such adjustment of said shaft the sleeves 66 will be rotated upon the fixed screws 65, thereby effecting the desired vertical movement of plate 29. This vertical adjustment of disc 29 relative to the table is for the purpose of adjusting the machine to accommodate cans of various heights. The screws 65 also effect a connection between said table and disc whereby, upon rotation of said table, corresponding rotation will be imparted to said disc. Said disc being operatively connected with plate 24 through the telescoping engagement between the sections 26 and 27 of the pea measuring devices, rotative movement imparted to the former, as just mentioned, will also be imparted to the latter, with the result that, in the operation of the machine, the table 55 and members 29 and 24 will move in unison.

The cans A to be filled are fed to the machine by means of a suitable feeding device or chute 70 of any ordinary or preferred construction, the cans thus introduced into the machine being deposited onto the table 55 in upright position and with their open ends facing upwardly. When thus deposited onto the table 55, the cans are engaged by can sweeps in the form of substantially radially disposed levers 71 arranged upon the upper side of said table and pivotally connected therewith at 72. Each of said levers is formed of two parts which are secured together by a bolt 71'. The outer ends of said levers are curved for engagement with the cans, the angularly formed inner ends thereof being provided with upstanding studs 73 which loosely engage in an irregular cam groove 74 formed in a cam member 75, which is rigidly secured by a screw 76 to column 12.

The can supply chute 70 communicates with the can carrying table directly below the plate 31 provided at the outlet of the hopper 17, as is clearly seen in Fig. 5. At this point each can, as the same is deposited on the can carrying table, is engaged by one of the levers 71 which, together with the table, commences revolving or carrying the can in a circular path about the column 12 as an axis in unison with pea and brine discharging devices.

Figure 8:
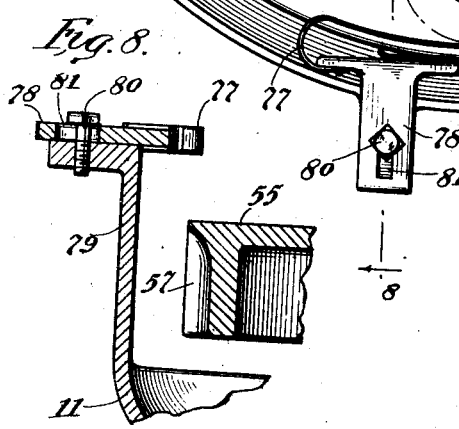
Fig. 8 is a detail section taken on substantially line 8—8 of Fig. 7.

By reason of the irregular formation of the cam groove 74, the levers 71 in the movement thereof about the column 12 will be periodically pivotally shifted. At the time of the deposit of a can on the table 55, the stud 73 of the lever 71, which engages the can, will be positioned in the circular concentrically formed portion $b$ of the cam groove 74. The arrangement is such that, at this point in the travel of the can, the same will be positioned directly below one of the pea measuring devices 26—27. As the can is carried along, the same will be swept past the plate 31, at which time the peas which have been previously deposited into said measuring device will be released and will thus drop into the open upper end of the can. Said lever 71 remains in fixed relation with the table until the stud 73 thereof passes from the circular concentrically formed portion $b$ of said cam groove into the inclined portion $c$ of said groove, whereupon the lever is swung rearwardly or retarded, such rearward swinging or retarding action continuing until the stud 73 engages with the reduced circular concentrically formed portion *d* of the groove, whereupon the lever will again remain in fixed relation with the can carrying table until the inclined portion *e* of the cam groove is reached by the stud 73, when the lever will again be rocked forward to its initial position. In this retarding or rearward swinging of the lever, the same will move from engagement with the can, and in order to correspondingly retard the can, a spring brush or stop 77 is provided, carried by a holder 78 mounted upon the upper end of a support 79 and adjustably secured thereto by a screw 80, as is clearly seen in Fig. 8. The holder 78 is formed with an elongated slot 81 to permit of adjustment of the member 77 toward or from the path of the cans.

In retarding the movement of the can, as just described, the can will be shifted in the direction of its orbit from pea receiving position, that is, from position under one of the pea measuring or discharging devices 26—27, to a position directly under one of the brine discharging devices leading from the brine reservoir. With this arrangement then, it will be seen that the cans, during the travel of the same in unison with the discharging elements of the machine, will each be automatically shifted from pea receiving position to brine receiving position, in order to successively receive the desired quantities of peas and brine.

Mounted in the can carrying table is a plurality of spaced can elevating plungers 82 positioned for engagement with the cans when in brine receiving positions or in the positions assumed by the cans after the same have been retarded, as above pointed out.

Figure 7:
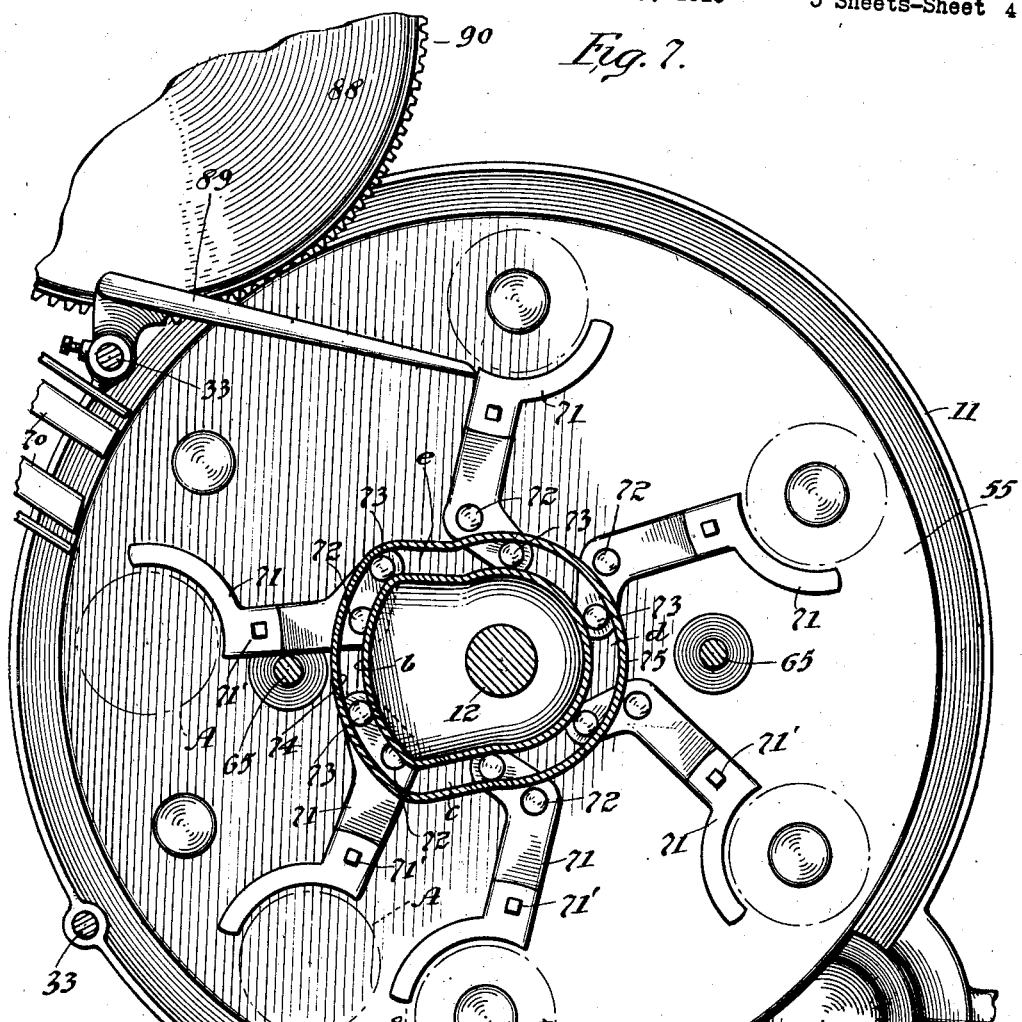
Fig. 7 is an enlarged horizontal section taken on substantially line 7—7 of Fig. 3.
Figure 9:
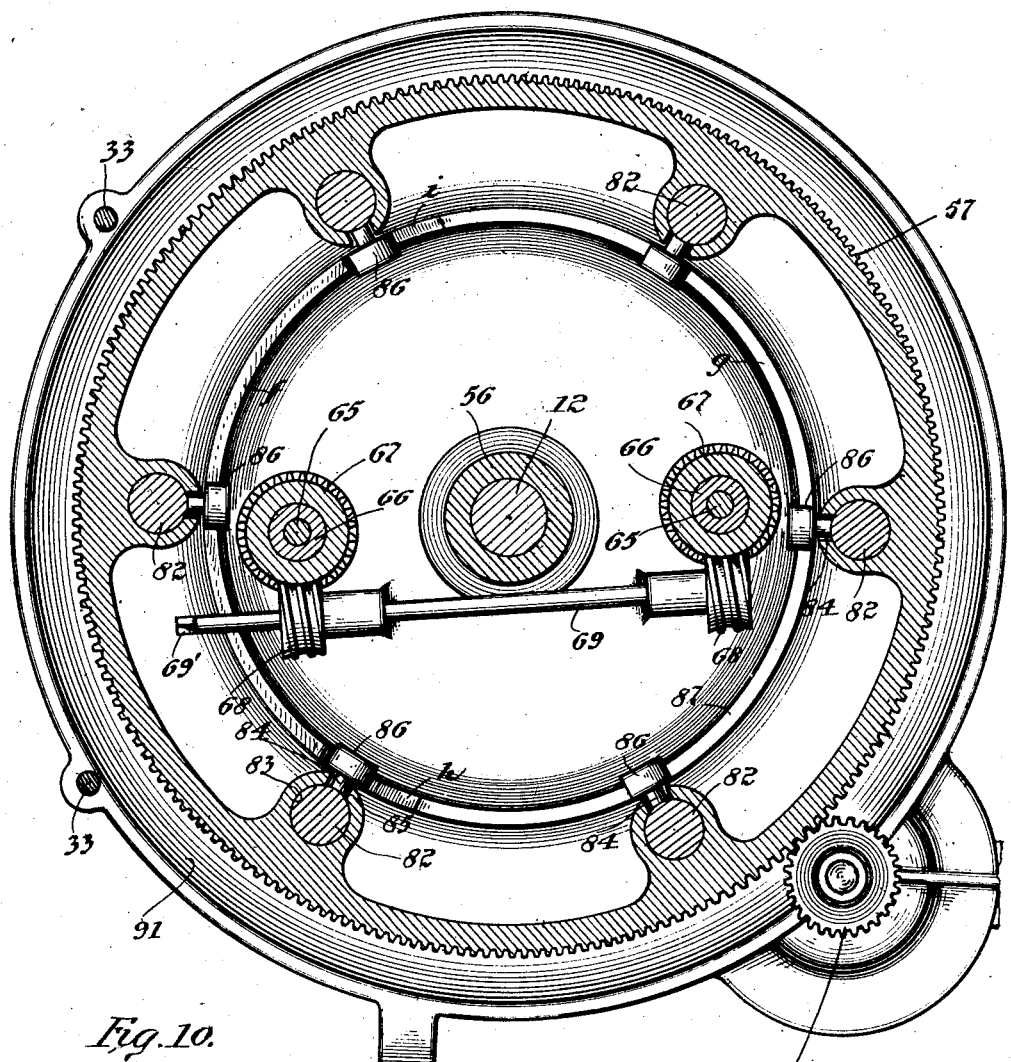
Fig. 9 is an enlarged horizontal section taken on substantially line 9—9 of Fig. 3.
Figure 10:
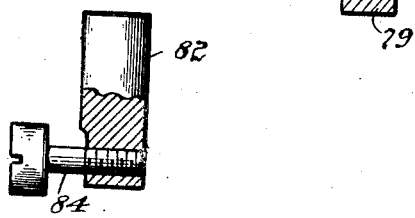
Fig. 10 is a side elevation, partly in section, of one of the can elevating plungers included in the construction, the rollers thereof being omitted.

Each of these plungers 82 is slidably mounted in a socket or guide 83 formed in the table 55, the under end thereof, when the plunger is in lowered position, being flush with the upper side of the table. The lower end of plunger is provided with an inwardly projecting stud 84 which passes through a vertical slot 85 and at the inner end of each stud is provided a roller 86 which rides upon an annular cam surface 87 formed upon the base 11. One side of the cam 87 is depressed, the other side *g* thereof being elevated, the depressed and elevated portions being connected by inclined portions *h* and *i*, as seen in Figs. 3 and 9. The arrangement is such that, as the table rotates, the plungers 83 will be periodically elevated and lowered, the elevation of each plunger occurring just after a can has been moved or retarded to position thereover, as above set forth, and the lowering of the plunger occurring just before the can is discharged from the machine. In the elevation of each plunger, which occurs as the roller 86 thereof rides up on the inclined portion *h* of the cam, the can positioned thereover will be elevated by said plunger into engagement with the corresponding pad 39 effecting, in turn, the elevation of said pad, in order to allow for the discharge of brine from the corresponding discharge mechanism into the can. The pressure of the springs 45 serves, of course, to press the pad 39 into secure engagement with the upper edge of the can forming a tight connection and thus preventing any wastage of the brine through spattering of the same upon adjacent portions of the machine. The brine continues to flow into the can until the same is filled, with the exception of the space therein occupied by the valve disc 47, and until the brine rises in the vent passage to the level of the brine in the brine reservoir. The valve disc is so designed that the displacement thereof is sufficient to accommodate the liquid which will flow back into the can from the vent passage upon withdrawal of the valve disc from the can, so that, with this arrangement, each can will be filled to the point desired notwithstanding that the voids between the peas of various cans may vary somewhat. The withdrawal of the valve from each can takes place when the can is lowered through descent of the plunger as the roller 86 thereof passes down the inclined portion *j* of the cam surface 87. After lowering of the can, as just mentioned, the same passes onto a can discharge disc 88 of conventional design arranged at one side of the machine adjacent the can chute 70, there being provided for cooperation with said disc the usual inwardly extending stationary deflecting arm 89 which projects over the can carrying table 55, as seen in Fig. 7 for engagement with the cans. The disc 88 is provided at its periphery with a gear 90 meshing with the gear 57 of the can carrying table, whereby said disc 88 is rotated. An annular trough 91 is formed at the upper side of the base 11 to collect any of the brine which may by chance, be splashed from the cans in the filling operation.

With a machine of the construction set forth, it will be seen that the cans will be fed thereto from the can chute 70 onto the table 55. After the deposit of each can upon said table and as the same is carried from under the plate 31, the same will be supplied with a measured quantity of peas from the corresponding measuring device 26—27 registering therewith. After thus receiving its supply of peas, the can will be automatically shifted or retarded, during the travel thereof, to position under one of the brine discharging mechanisms where the same will receive its supply of brine, the brine being discharged into the can upon the upward thrusting of the latter which automatically effects opening of the corresponding brine discharge passage. It will thus be seen that the discharge of brine is controlled directly by the can so that when the supply of cans to the machine ceases, the discharge of brine will also cease. Wastage of brine is thus prevented.

The pea measuring or discharge devices and the brine discharge device, as above mentioned, are alternately arranged, there being one of each cooperating with each can, said devices being arranged in the same plane, thereby producing a compact construction, which, of course, is highly desirable. The size of the pea measuring devices may be readily and easily adjusted, during operation of the machine, through manipulation of the wheel 14' provided at the upper end of the column 12, rotary adjustment of said wheel resulting in vertical movement of all of the upper sections 26 of the pea measuring devices and hence in simultaneous adjustment of the size of all of the pea measuring devices.

In this specification I have employed the terms "peas" and "brine" to designate the filling materials which are placed in the cans, but I wish it to be understood that these terms are used as a matter of convenience only, and I do not limit myself thereto, since the machine is well adapted for filling cans with many kinds of mixtures in which granular material is combined with a liquid. Moreover, I do not wish to limit myself to the precise details of construction set forth, but desire to avail myself of such variations and modifications as come within the scope of the appended claims.

Having thus described my invention, what I claim is new and desire to secure by Letters Patent is:

1. In a machine for filling cans, a plurality of movable filling material discharging means; means for moving said discharge means, one after another, in substantially the same path; can moving means; and means for effecting relative movement between a can and said discharging means to secure successive registration of the can with each of said discharging means.

2. In a machine for filling cans, a plurality of movable filling material discharging means; means for moving said discharge means, one after another, in substantially the same path; can moving means; and means, operative at a predetermined point in the movement of said parts, for effecting relative movement between a can and said discharging means to secure successive registration of the can with each of said discharging means.

3. In a machine for filling cans, a plurality of movable filling material discharging means; means for moving said discharging means, one after another, in substantially the same path; means for moving a can in unison with said discharging means; and means, operating during such movement, to effect relative movement between a can and said discharging means to secure successive registration of the can with each of said discharging means.

4. In a machine for filling cans, a plurality of spaced revolving filling material discharging means; means for revolving said discharging means, one after another, about the same axis; rotary means for moving a can in a plane below said discharging means whereby a can receives the material discharged from said discharging means while the can is in motion; and means for effective relative movement between the can and said discharging means to secure successive registration of the cans with each of said discharging means.

5. In a can filling machine, a movable element having a plurality of means movable substantially in the same path for discharging a plurality of different kinds of filling material; means for moving a can in unison with said element; and means, operative during such movement, for effecting relative movement between the can and said discharging means to secure successive registration of the can with each of said discharging means.

6. In a can filling machine, a rotary can carrier; a superposed rotary element movable in unison with said carrier and having a plurality of means cooperating with each can and movable substantially in the same path for discharging a plurality of different kinds of filling material thereinto; and means for periodically altering the relative position between said element and a can carried by said carrier to secure successive registration of the can with each of the discharging means cooperating therewith.

7. In a can filling machine, a rotary can carrier; a superposed rotary element movable in unison with said carrier and having a plurality of means cooperating with each can and movable substantially in the same path for discharging a plurality of different kinds of filling material thereinto; and means for periodically shifting the position of a can on said carrier to effect registration thereof with each of the discharging means cooperating therewith.

8. In a can filling machine, a rotary can carrier; a superposed rotary element movable in unison with said carrier and having a plurality of spaced material discharging means for cooperation with each can on said carrier; and means for shifting each can on said carrier in the direction of the orbit of the can to effect successive registration thereof with each of the discharging means cooperating therewith.

9. In a machine for filling cans, rotary can moving means; a plurality of superposed spaced material discharging means revolving in unison with and about the same axis as said can moving means, arranged for cooperation with each of the cans moved by said can moving means; and means, operative during movement of each can, for effecting shifting thereof relative to said discharging means in the direction of the orbit of the can for securing successive registration of each can with each of said discharging means cooperating therewith.

10. In a machine for filling cans, rotary can moving means; a plurality of superposed spaced material discharging means revolving in unison with and about the same axis as said can moving means, arranged for cooperation with each of the cans moved by said can moving means; and cam controlled means, operative during movement of each can, for effecting shifting thereof relative to said discharging means in the direction of the orbit of the can for securing successive registration of each can with each of the discharging means cooperating therewith.

11. In a machine for filling cans, rotary can moving means; a plurality of superposed spaced material discharging means revolving in unison with and about the same axis as said can moving means, arranged for cooperation with each of the cans moved by said can moving means; and means, operative during movement of each can, for effecting shifting thereof relative to said discharging means in the direction of the orbit of the can for securing successive registration of each can with each of said discharging means cooperating therewith, said means comprising a revolving lever cooperating with each can.

12. In a machine for filling cans, a plurality of movable material discharging means arranged for cooperation with each can; can moving means comprising a plurality of revolving levers engaging the cans; and means for rocking said levers during the revolving thereof to permit of relative movement between the cans and said discharging means for securing successive registration of each can with each of said discharging means cooperating therewith.

13. In a machine for filling cans, a plurality of movable material discharging means arranged for cooperation with each can; can moving means comprising a plurality of revolving levers engaging the cans; and a cam for revolving said levers during the revolving thereof to permit of relative movement between the cans and said discharging means for securing successive registration of each can with each of said discharging means cooperating therewith.

14. In a machine for filling cans, a plurality of movable material discharging means arranged for cooperation with each can; can moving means comprising a plurality of revolving levers engaging the cans; and a stationary cam engaged by the inner ends of said levers for rocking the same during the revolving thereof to permit of the relative movement between the cans and said discharging means for securing successive registration of each can with each of said discharging means cooperating therewith.

15. In a machine for filling cans, a plurality of movable material discharging means arranged for cooperation with each can; and means for imparting to each can movement of varying speed to effect successive registration thereof with each of the discharging means cooperating therewith during movement of the latter.

16. In a machine for filling cans, a plurality of movable material discharging means arranged for cooperation with each can; means for imparting to each can movement of varying speed to effect successive registration thereof with each of the discharging means cooperating therewith during movement of the latter, said means comprising can impelling means; and means for periodically retarding the movement of said impelling means.

17. In a machine for filling cans, a plurality of movable material discharging means arranged for cooperation with each can; means for imparting to each can movement of varying speed to effect successive registration thereof with each of the discharging means cooperating therewith during movement of the latter, said means comprising can impelling means; means for periodically retarding the movement of said impelling means; and means for retarding the movement of a can when the impelling means cooperating therewith is retarded.

18. In a machine for filling cans, a plurality of movable material discharging means arranged for cooperation with each can; means for imparting to each can movement of varying speed to effect successive registration thereof with each of the discharging means cooperating therewith during movement of the latter, said means comprising can impelling means; means for periodically retarding the movement of said impelling means; and yieldable means for retarding the movement of a can when the impelling means cooperating therewith is retarded.

19. In a machine for filling cans, a plurality of movable material discharging means arranged for cooperation with each can; means for imparting to each can movement of varying speed to effect successive registration thereof with each of the discharging means cooperating therewith during movement of the latter, said means comprising can impelling means; means for periodically retarding the movement of said impelling means; and means adjustable toward and from the cans for retarding the movement of a can when the impelling means cooperating therewith is retarded.

20. In a machine for filling cans, the combination of can conveying means; a movable element arranged above said can conveying means; a plurality of discharging means for one kind of filling material carried by said element; a plurality of discharging means for another kind of filling material also carried by said element and arranged alternately with reference to said first mentioned discharging means said second plurality of discharging means being movable substantially in the same path as said first set of discharging means, and a separate source of supply for each kind of material.

21. In a machine for filling cans, the combination of can conveying means; a movable element arranged above said can conveying means; a plurality of discharging means for one kind of material carried by said element; a plurality of discharging means for another kind of material also carried by said element and arranged alternately with reference to said first mentioned discharging means, said discharging means being all arranged equidistant from the center of rotation of said element; and a separate source of supply for each kind of material.

22. In a machine for filling cans, the combination of can conveying means; a movable element arranged above said can conveying means; a plurality of discharging means for one kind of material carried by said element; a plurality of discharging means for another kind of material also carried by said element and arranged alternately with reference to said first mentioned discharging means, said discharging means being all arranged equidistant from the center of rotation of said element, and being substantially co-planar; and a separate source of supply for each kind of material.

23. In a machine for filling cans, a plurality of movable filling material discharging means for cooperation with each can; means for moving said discharging means, one after another, in substantially the same path; can moving means; means, operative during movement of the discharging means and cans, for effecting relative movement between a can and said discharging means to secure successive registration of the can with each of said discharging means cooperating therewith; and means for thrusting the can toward one of said discharging means after the can is positioned in registration therewith.

24. In a machine for filling cans, a plurality of movable filling material discharging means for cooperation with each can; means for moving said discharging means, one after another, in substantially the same path; can moving means; means, operative during movement of the discharging means and cans, for effecting relative movement between a can and said discharging means to secure successive registration of the can with each of said discharging means cooperating therewith; means for thrusting the can toward one of said discharging means after the can is positioned in registration therewith; and means for discharging from the last mentioned discharging means upon thrusting of the can toward the same.

25. In a machine for filling cans, a plurality of revolving filling material discharging means for cooperation with each can; means for revolving said discharging means about the same axis in substantially the same path; can revolving means; means, operative during revolving of the discharging means and cans, for effecting relative movement between a can and said discharging means to secure successive registration of the can with each of said discharging means cooperating therewith; and means for thrusting the can toward one of said discharging means after the can is positioned in registration therewith.

26. In a machine for filling cans, a plurality of revolving filling material discharging means for cooperation with each can; means for revolving said discharging means about the same axis in substantially the same path; can revolving means; means, operative during revolving of the discharging means and cans, for effecting relative movement between a can and said discharging means to secure successive registration of the can with each of said discharging means cooperating therewith; means for thrusting the can toward one of said discharging means after the can is positioned in registration therewith; and means for discharging from the last mentioned discharging means upon thrusting of the can toward the same.

27. In a machine for filling cans, the combination of can conveying means; a movable element arranged above said can conveying means; a series of discharging means for one kind of filling material carried by said element; a second series of discharging means for another kind of filling material also carried by said element and arranged alternately with reference to said first mentioned discharging means; means, operative during movement of the discharging means and cans, for effecting relative movement between a can and said discharging means to secure registration of each can with one of the discharging means of each of said series of discharging means; and means for thrusting each can toward the corresponding discharging means of one of said series as the can is brought into registration therewith.

28. In a machine for filling cans, the combination of can conveying means; a plurality of discharging means for one kind of filling material; a plurality of discharging means for another kind of filling material arranged alternately with reference to said first mentioned discharging means; said second plurality of discharging means being movable substantially in the same path as said first set of discharging means; and a separate source of supply for each kind of material.

29. In a machine for filling cans, the combination of can conveying means; a plurality of discharging means for one kind of filling material; a plurality of discharging means for another kind of filling material arranged alternately with reference to said first mentioned discharging means; said second plurality of discharging means being movable substantially in the same path as said first set of discharging means; a separate source of supply for each kind of material; and means for thrusting the cans toward the discharging means of one of said series.

30. A filling machine comprising a circular series of devices for discharging granular material, a circular series of devices for discharging liquid material, said two series being rotatable about the same axis, a series of can sweeps for moving a series of cans about said axis, and means for retarding said sweeps and said cans at certain points in their movement to cause the cans to be shifted from underneath the discharge devices of one of said series to a position underneath the discharge devices of the other of said series.

31. A filling machine comprising a circular series of measuring pockets rotatable about an axis for measuring and discharging granular material, a circular series of devices for discharging liquid material rotatable about said axis, a series of sweeps for moving a series of cans about said axis, and means for retarding said sweeps and cans to cause the cans to be shifted from a position underneath said measuring devices to a position underneath said liquid discharging devices.

32. A filling machine comprising a circular series of devices for discharging granular material, a circular series of devices for discharging liquid material, said two series being rotatable about the same axis, a series of can sweeps for moving a series of cans about said axis, and cam means for retarding said sweeps at certain points in their movement to cause the cans to be shifted from underneath the discharge devices of one of said series to a position underneath the discharge devices of the other of said series.

33. A filling machine comprising a circular series of devices for discharging granular material a circular series of devices for discharging liquid material, said two series being rotatable about the same axis, a series of can sweeps for moving a series of cans about said axis, means for retarding said sweeps at certain points in their movement and spring means for retarding said cans to cause the cans to be shifted from underneath the discharge devices of one of said series to a position underneath the discharge devices of the other of said series.

34. A filling machine comprising a series of devices for discharging granular material, movable in a definite path, a series of devices for discharging liquid material, movable in substantially the same path, means for moving a series of cans in substantially the same path, and means for shifting said cans from a position to receive the discharge from said first series to a position to receive the discharge from said second series.

35. A filling machine comprising a rotatable series of devices for discharging granular material, a circular series of devices for discharging liquid material, said series being rotatable about the same axis in substantially the same path, means for moving a series of cans about the same axis, and means for shifting said cans from a position to receive the discharge from said first series to a position to receive the discharge from said second series.

In witness whereof, I have hereunto subscribed my name.

AUGUST HOLMQUIST, Sr.

Witnesses:
  I. E. MERRITT,
  E. E. GATES.